US012027759B2

United States Patent
Rossi

(10) Patent No.: US 12,027,759 B2
(45) Date of Patent: Jul. 2, 2024

(54) JEWEL WITH WIRELESS COMMUNICATION DEVICE

(71) Applicants: FORTITUDO DIAMONDS S.R.L., Milan (IT); Nicola Rossi, Milan (IT)

(72) Inventor: Nicola Rossi, Milan (IT)

(73) Assignee: FORTITUDO DIAMONDS S.R.L., Milan (IT)

( * ) Notice: Subject to any disclaimer, the term of this patent is extended or adjusted under 35 U.S.C. 154(b) by 214 days.

(21) Appl. No.: 17/780,104

(22) PCT Filed: Nov. 20, 2020

(86) PCT No.: PCT/IB2020/060958
§ 371 (c)(1),
(2) Date: May 26, 2022

(87) PCT Pub. No.: WO2021/105829
PCT Pub. Date: Jun. 3, 2021

(65) Prior Publication Data
US 2023/0008911 A1    Jan. 12, 2023

(30) Foreign Application Priority Data
Nov. 29, 2019 (IT) .................. 102019000022479
Nov. 4, 2020 (IT) .................. 102020000026344

(51) Int. Cl.
*G06K 19/077* (2006.01)
*H01Q 1/27* (2006.01)
(Continued)

(52) U.S. Cl.
CPC ....... *H01Q 1/273* (2013.01); *G06K 19/07762* (2013.01); *H01Q 1/526* (2013.01); *A44C 9/0053* (2013.01)

(58) Field of Classification Search
CPC .. H01Q 1/273; H01Q 1/526; G06K 19/07762; G06K 7/10168; G06K 19/07771; A44C 9/0053
See application file for complete search history.

(56) References Cited

U.S. PATENT DOCUMENTS

2009/0188971 A1*  7/2009  Chambon ................. G07F 7/08
                                              340/568.1
2014/0260424 A1*  9/2014  Warren ............... A44C 17/0233
                                              63/1.13
(Continued)

FOREIGN PATENT DOCUMENTS

DE       4443253 A1    5/1996
WO    2019032617 A1    2/2019

OTHER PUBLICATIONS

International Preliminary Report on Patentability dated Feb. 22, 2021 re: Application No. PCT/IB2020/060958, pp. 1-13, citing: US 2014/292477 A1, WO 2019/032617 A1, DE 44 43 253 A1, US 2016/0196487 A1 and US 2018/0310677 A1.
(Continued)

*Primary Examiner* — Nay Tun
(74) *Attorney, Agent, or Firm* — CANTOR COLBURN LLP

(57) ABSTRACT

A jewel includes a main body and at least one wireless communication device accommodated within a cavity formed in the main body. The at least one communication device is arranged slanting with respect to a bottom wall of the cavity, partly accommodated in an undercut region of the cavity and spaced from the bottom wall and from walls at opposed ends of the cavity, whereby propagation of the signal in the space between the at least one communication device and the walls of the cavity is allowed.

14 Claims, 4 Drawing Sheets

(51) Int. Cl.
*H01Q 1/52* (2006.01)
*A44C 9/00* (2006.01)

(56) References Cited

U.S. PATENT DOCUMENTS

| | | |
|---|---|---|
| 2014/0292477 A1 | 10/2014 | Ahmadloo |
| 2016/0196487 A1 | 7/2016 | Huynh |
| 2017/0365194 A1* | 12/2017 | Dholakiya ......... G06Q 30/0601 |
| 2018/0310677 A1 | 11/2018 | Gloyer et al. |

OTHER PUBLICATIONS

International Search Report dated Feb. 22, 2021 re: Application No. PCT/IB2020/060958, pp. 1-4, citing: US 2014/292477 A1, WO 2019/032617 A1, DE 44 43 253 A1, US 2016/0196487 A1 and US 2018/0310677 A1.
Written Opinon dated Feb. 22, 2021 re: Application No. PCT/IB2020/060958, pp. 1-8, citing: US 2014/292477 A1, WO 2019/032617 A1, DE 44 43 253 A1, US 2016/0196487 A1 and US 2018/0310677 A1.

* cited by examiner

JEWEL WITH WIRELESS COMMUNICATION DEVICE

TECHNICAL FIELD

The present disclosure relates to a jewel with wireless communication device.

BACKGROUND

In the jewelry and costume jewelry field, a great variety of jewels and valuables in general are known.

According to customer needs, it is known to inscribe information onto the useful surface of the jewel, such as for example the date of a particular event, the name of a person related to the jewel, or a short sentence. The jewel becomes suitable to remember a particular event or person; however, apart from the person concerned, such limited information defines an incomplete message which is, very often, incomprehensible by third parties. The inscribed information is however limited by the useful surface that the jewel itself offers, and do not allow, for example, to identify the legitimate owner of the jewel in order to return it following loss or theft.

With the advent of electronic miniaturization, and with the development of new telecommunications technologies, in recent decades jewels have been developed which are provided with integrated electronics in sufficiently large portions of the jewel, in particular with an embedded wireless communication device, suitable to perform several functions, such as, for example, storage of various type of information and communication with external electronic devices to retrieve information from the jewel and/or from a remote server, or activation/deactivation of an external device. It is thus possible to associate various type of information to the jewel, also multimedia information, so as to crystallize forever a moment, a memory, an emotion to be given and handed down; it is also possible to use the jewel as electronic key and similar applications.

Because the material of which jewels are made is predominantly metallic, it may interfere with the wireless communication between the wireless communication device embedded in the jewel and the external electronic device. The metal of which the jewel is made determines a magnetic shielding of the wireless communication device impairing its proper functioning.

US2014/292477A1 relates to a system for the identification and authentication of items of precious metal or jewelry, comprising: (a) a radio frequency identification ("RFID") chip packaged within electromagnetic absorbing material placed in a cavity of an item of precious metal or jewelry, and comprising a unique identifier for the item; (b) an RFID reader configured to operatively communicate with the RFID chip and retrieve or read the unique identifier, further configured to operatively communicate with a personal computer; and (c) a database operatively disposed in the personal computer, and configured to store the unique identifier and to associate it with data associated with the item. A resin layer covers the RFID chip in the cavity of the item.

As best understood by the present inventor, the electromagnetic absorbing material is arranged all around the RFID chip apart on its face provided with the antenna and facing the external of the cavity, while only this face is covered by a thin resin layer. The electromagnetic absorbing material isolates the RFID chip from interferences caused by the presence of the surrounding metal (eddy currents and electromagnetic reflections), and limits the useful reading distance in order to improve security against undesired readings. The resin layer protects the chip against mechanical and chemical actions, still allowing the desired electromagnetic properties.

WO2019/032617A1 discloses a head for mounting a precious or semi-precious gem to an article of jewelry, comprising a ferrimagnetic body comprising a cavity configured to accept the gem, and a near field communication (NFC) circuit electrically connected to an antenna, wherein the antenna is wrapped around and against the ferrimagnetic body. In particular, the antenna spirally wraps outside of and along the entire height of the wall of the ferrimagnetic body. A very thin layer of epoxy resin or other electrically non-conductive material may be provided for, about the assembly formed of the ferrite body and the antenna wrapped thereonto, and the whole is housed in a jaw setting. This epoxy resin layer, that in any case does not fill the seat housing the communication circuit, only has a mechanical function, namely that of protecting the spirally wrapped antenna and the chip against abrasion and breakage, and of providing a surface more suitable for gluing. On the other hand, the document prevents the jewel from interfering with the signal by providing for a gap in the jaw, besides configuring the antenna as a non-planar one.

US2016/196487A1 relates to an article of jewelry comprising: (a) a housing permitting passage of an NFC signal, having a lower layer joined to an upper layer; (b) an NFC chip housed within the housing; (c) a gemstone covering the upper layer of the housing; (d) a bezel substantially surrounding the outer perimeter of the housing and on a same plane as the NFC chip, wherein the bezel is formed from a highly electrically conductive material, that permits near field communication with the NFC chip. In order to prevent shielding caused by the jewel material, a gap separates the opposed ends of the bezel. The document does not provide for filling the NFC chip housing cavity with epoxy resin.

DE4443253A1 discloses a finger ring with a storage unit and at least two electrically conductive, mutually insulated ring elements, which are electrically connected to the storage unit and serve as contacts for information and/or energy transmission. A potting compound serves both for embedding the storage unit in a recess in the finger ring and also as insulator and for fastening the contacts, which are electrically connected to those of the information storage unit.

The disclosure faces the technical problem of providing for a suitable electromagnetic shielding in a jewel with embedded wireless communication device.

SUMMARY

In an aspect the disclosure relates to a jewel comprising a main body and at least one wireless communication device accommodated within a cavity formed in said main body, wherein said at least one communication device is spaced at least in part from the material of which said main body is made, so as to avoid shielding effects of an electromagnetic type produced by said material to the detriment of the functionality of said at least one communication device:

through the fact that said at least one communication device is arranged slanting with respect to a bottom wall of the cavity, partly accommodated in an undercut region of the cavity and spaced from the bottom wall and from walls at opposed ends of the cavity, so as to allow propagation of the signal in the space between the communication device and walls of the cavity, or through spacer means comprising an epoxy resin compound adapted to fill said cavity and to embed at least partly said at least one communication device.

Thanks to the arrangement according to the first alternative, the communication signal may propagate about and under the communication device.

According to the second alternative, the epoxy resin advantageously achieves the dual purpose of keeping the device spaced from the material of the main body and of avoiding interference by said material with the communications.

In an aspect the disclosure relates to a jewel comprising a main body and at least one wireless communication device accommodated within a cavity formed in said main body, wherein said at least one communication device is arranged slanting with respect to a bottom wall of the cavity, partly accommodated in an undercut region of the cavity and spaced from the bottom wall and from walls at opposed ends of the cavity, so as to allow propagation of the signal in the space between the communication device and walls of the cavity.

In an aspect the disclosure relates to a jewel comprising a main body and at least one wireless communication device accommodated within a cavity formed in said main body, wherein the communication device comprises a planar antenna (such as for example a disc-shaped one) on a first face thereof and is arranged with its first face facing towards a mouth of the cavity, and is slanting with respect to a bottom wall of the cavity and spaced from the cavity walls at a second face thereof opposite the first face, and at least at another pair of opposed faces thereof, so as to allow propagation of the signal in the space between the communication device and the cavity walls.

Preferably the cavity has an undercut region.

In an aspect the disclosure relates to a jewel, preferably an improved jewel, particularly with increased functionality, comprising a main body, characterized in that it comprises at least one microchip accommodated in a cavity formed in said main body, said cavity being of the open type and comprising inside it means for spacing said at least one microchip from the material of which said main body is made, so as to avoid shielding effects of an electromagnetic type produced by said material to the detriment of the functionality of said at least one microchip.

Preferably said spacer means comprise an epoxy resin compound adapted to fill said cavity and to embed at least partly said at least one microchip.

Preferred features of the jewel according to the various aspects of the disclosure are indicated hereinafter.

Preferably the communication device is held in the cavity through interference fit between a pair of its opposed faces and two opposed lateral walls of the cavity, said opposed faces thereof being different from one first face thereof, facing toward the undercut and the mouth of the cavity.

In the present description and attached claims, under "interference fit" or "friction fit" it is meant that the wireless communication device is held in the cavity due to the friction that forms between faces thereof and the cavity walls, but there are no fixing means interposed between the cavity and the wireless communication device.

Preferably the wireless communication device is inserted within the cavity with such an orientation that the plane of its first face facing toward the undercut and the mouth of the cavity forms an acute angle with a plane defined by the bottom wall of the cavity or by the mouth of the cavity.

More preferably, said angle is comprised between 4.5° and 7°, more preferably is 5.8°.

Preferably the leads of an antenna of the communication device face the undercut region.

The wireless communication device may comprise a planar antenna onto its first face.

Preferably the jewel comprises a plate made of an essentially amagnetic material, preferably a hard stone, which closes the mouth of the cavity, hiding at least part of said communication device from view.

Preferably the hard stone plate is made of a hard stone selected from the group comprised of Malachite, Onyx, Mother of Pearl, Lapis Lazuli, Turquoise, Coral, Opal, Garnet, Aquamarine, Actinolite, Agate, Botswana Agate, Moss Agate, Alexandrite, Stromatolytic Algae, Amazonite, Amber, Amethyst, Ammonite, Andalusite, Angelite, Antimonite, Apatite, Yellow Apatite, Apophyllite, Aragonite, Astrophyllite, Aventurine, Azurite, Barite, Yellow Beryl, Biotite, Blenda, Bornite, Bronzite, Cacoxenite, Chalcedony, Calcite, Blue Calcite, Optical Calcite, Chalcopyrite, Celestite, Cassis Madagascaristensis, Charoite, Chiastolite, Cleavelandite, Cobalt Calcite, Coral, Bamboo Coral, Carnelian, Chrysoberyl, Chrysocolla, Chrysoprase, Rock Crystal, Chromodiopside, Cypraecassis Rufa, Danburite, Diamond, Rough Diamond, Jasper, Dalmatian Jasper, Orbicular Jasper (Oceanic Jasper), Diopside, Dioptite, Dumerite, Ekanite, Heliodorus, Heliotrope, Hematite, Hemimorphite, Enstatite, Eosite-Epidote, Phlogopite, Fluorite, Fuchsite, Gasparite, Nephrite Jade, Gypsum, Jade, Garnet, Herkimer, Heulandite-Hiddenite, Howlite, Iolite (Cordierite), Kunzite, Labradorite (Spectrolite), Lapis Lazuli, Larimar (Blue Pectolite), Etna Lava, Fossil Wood, Lepidocrosite, Lepidolite, Madreperla, Madrepora, Colored Magnesite, Magnetite, Malachite, Mangano Calcite, Marcasite, Martite-Meteorite, Mokaite, Moldavite, Moqui Marbles, Morganite, Muscovite, New Jade, Ox's Eye, Hawk's Eye, Iron Eye, Cat's Eye, Tiger's Eye, Shiva's Eye, Olivine, Onyx, Opal, Andean Opal, Boulder Opal, Fire Opal, Opalite, Orpiment, Orthoclase, Obsidian, Snowflake Obsidian, Noble Obsidian, Pectolite, Leopard Skin, Pearls, Pietersite, Moonstone, Sunstone, Stone of 'Gold, Paesina Stone, Pyrite, Prasiolite, Prehnite, Ametrine Quartz, Cathedral Quartz, Citrine Quartz, Nematoid Quartz, Smoky Quartz, Hyaline Quartz, Lemon Quartz-Madeira Quartz, Morion Quartz, Rose Quartz, Rutilated Quartz, Skeleton Quartz, Tourmaline Quartz, Lodolite Quartz, Root of Emerald, Native Copper, Realgar, Rhyolite, Rhodochrosite, Rhodolite, Rhodonite, Ruby, Ruby-Fuchsite, Ruby-Zoisite (Anyolite), Rock salt, Scapolite, Septaria, Selenite, Serafinite, Serpentine (Verdite), Shungite, Sillimanite, Emerald, Sodalite, Spectrolite, Spinel, Staurolite, Stilbite, Strombus Gigas, Sugilite, Tanzanite, Tectite, Titanite, Topaz, Tourmaline, Black tourmaline, Green tourmaline, Tsavorite, Turquoise, Ulexite, Unakite, Uvarovite, Vanadinite, Variscite, Zaffir, Zircon, Zoisite and Sulfur.

Preferably the hard stone plate has a thickness comprised between 1.5 mm and 2.00 mm.

Preferably the cavity has the shape of an irregular dodecahedron, it being defined by:
  a parallelepiped chamber having a first face defining the bottom wall of the cavity, a second face opposite the first one and at which the mouth of the cavity is defined, a third and a fourth faces orthogonal to the first and the second faces, opposite to each other and defining lateral walls of the cavity, the parallelepiped chamber being open at a fifth and a sixth faces orthogonal to the first to fourth faces and opposite to each other, and two chambers having the shape of a right pyramid open at the respective base face, said respective base faces coinciding with said fifth and sixth faces of the parallelepiped chamber.

Preferably, the distance between the third and fourth faces of the parallelepiped chamber is such as to provide the interference fit with the communication device, thus is essentially equal to the distance between the coupling faces of the communication device, the distance between the first and second faces of the parallelepiped chamber is such as to allow accommodation of the communication device with the desired slant and spaced from the bottom of the cavity, the distance between the fifth and sixth faces of the parallelepiped chamber is such as to allow accommodation of the communication device with the desired slant and spaced from triangular walls of the pyramid-shaped chambers of the cavity.

Preferably the wireless communication device comprises a Near Field Communication (NFC) microchip.

Preferably the jewel comprises at least one precious stone or the like associated with said main body by virtue of retention means at said cavity, said retention means being formed at the perimetral edge of said cavity so as to hide said wireless communication device, as well as said epoxy resin if provided for, from the user's view.

Said main body may be made of a precious metal selected from the group of metals constituted by: silver, gold, platinum, palladium, iridium, rhodium, ruthenium, and osmium.

Said main body may alternatively be made of a non-precious metal selected from the group of metals constituted by: steel, aluminum, titanium, copper, brass, lead, zinc, nickel, vanadium, tungsten, iron, tin, and beryllium.

Said main body may alternatively be made of a material selected from the group of materials constituted by: ceramic materials, polymeric materials, and composite materials.

Preferably, said at least one precious stone or the like is a stone selected from the group of precious stones constituted by: diamonds, rubies, emeralds, ivory, coral, pearls, and amber.

Preferably, said at least one precious stone or the like has an identification code etched on an external portion thereof and associated in a one-to-one relation with said at least one wireless communication device.

In an aspect the disclosure relates to a telematic system, comprising:
a Jewel according to one or more of the aspects indicated above, and having one or more of the preferred features indicated above, and
at least one terminal comprising first communication means adapted to communicate with said communication device in order to receive at least one identification code associated with said jewel and second communication means adapted to communicate via a telematic network with a server; said server being configured to send information associated with said identification code to said terminal.

Advantageously, the jewel with embedded electronics of the disclosure allows communication between the electronics and a reader, in particular a smartphone, without any interference by the material of which said jewel is made. Moreover, no drilling of precious stones is required, a small cavity is sufficient, which is easily concealed from view and does not interfere with the brilliance of precious stones and other aesthetic aspects of the jewel, and no adhesives are necessary, which could ruin the purity and distort the weight to value ratio of the jewel.

Accordingly, besides achieving the intended purpose of providing the suitable electromagnetic shielding, advantageously the integration of a wireless communication device within a jewel according to the disclosure respects the integrity of precious stones or similar as much as possible, affects the aesthetics of the jewel as little as possible, allowing the creation of a jewel with an almost unchanged aesthetic compared to traditional type jewels, and avoids the addition of material different from those of the jewel as much as possible.

BRIEF DESCRIPTION OF THE DRAWINGS

Further features and advantages of the present disclosure will be more clearly apparent from the following detailed disclosure of some preferred embodiments thereof, made with reference to the attached drawings, wherein.

DETAILED DESCRIPTION OF THE DRAWINGS

Figure 1:
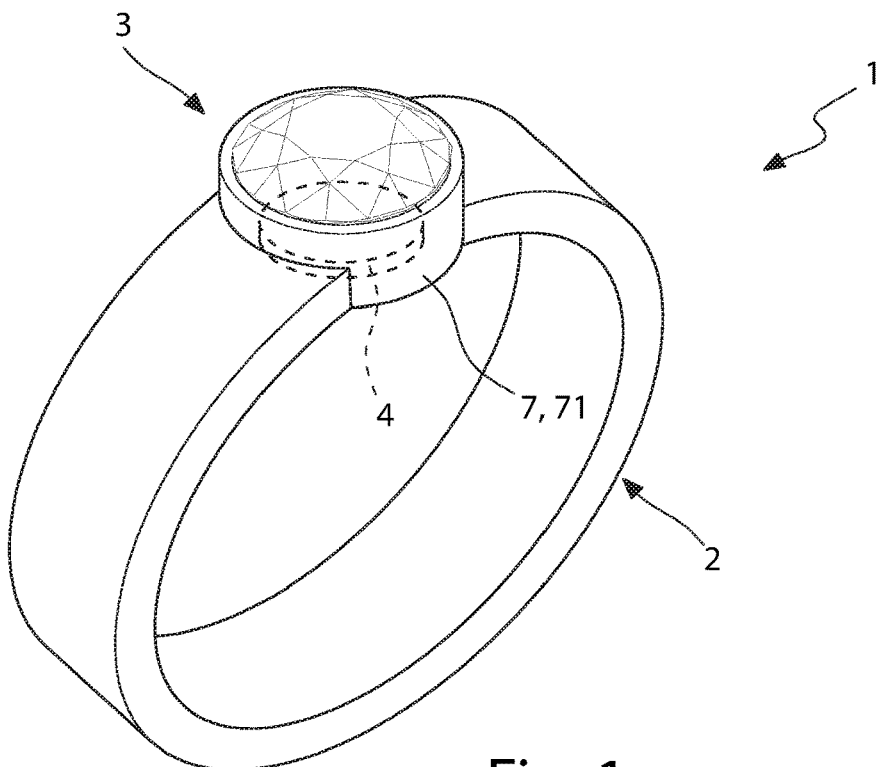
FIG. 1 is a diagrammatical perspective view of a jewel according to an embodiment of the disclosure.
Figure 2:
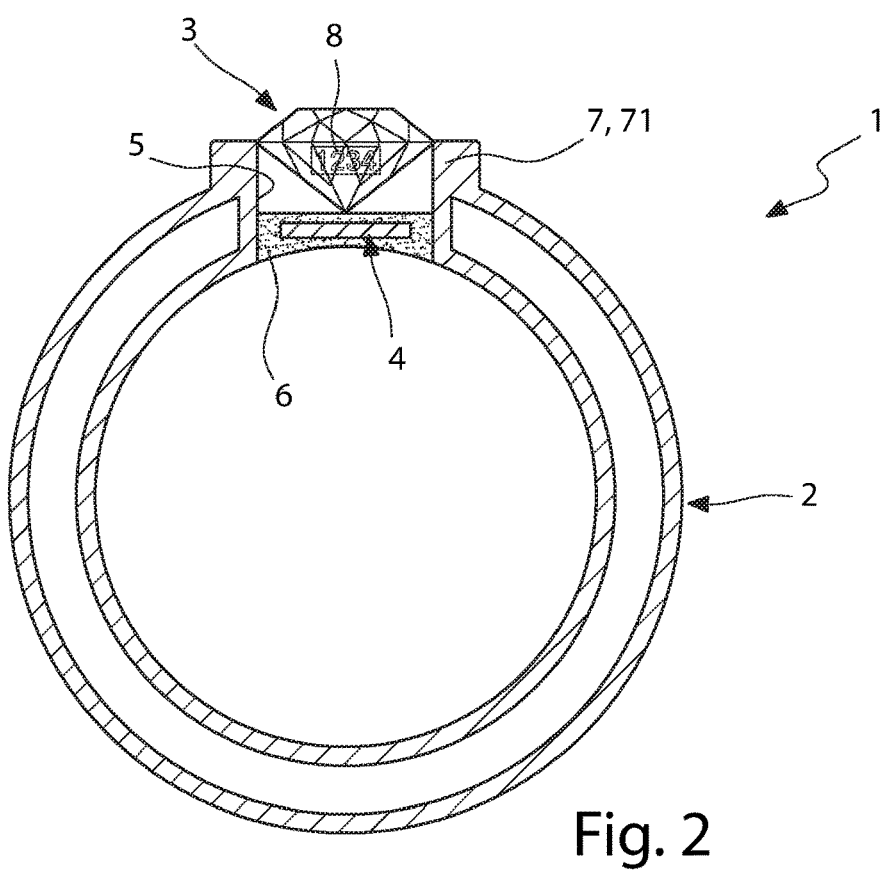
FIG. 2 is a sectional view along a frontal plane of the jewel shown in FIG. 1.

With particular reference first to FIGS. 1-2, a jewel of the disclosure is globally indicated with reference number 1. Jewel 1 is also called improved jewel hereinbelow, particularly with increased functionality, because it comprises a wireless communication device.

Jewel 1 is, in the proposed embodiment, a finger ring. However the present disclosure can be embodied in other types of jewels such as, for example, necklaces, pendants, bracelets, earrings, rings and solitaires, anklets, diadems, tennis, rings, wedding rings, charms, brooches, cufflinks, without departing from the inventive concept disclosed hereinbelow.

In the proposed embodiment, jewel 1 comprises a main body 2 and at least one precious stone 3 or similar associated with the main body 2.

In greater detail, main body 2 may be made of a precious metal selected from the group of metals constituted by: silver, gold, platinum, palladium, iridium, rhodium, ruthenium, and osmium; or it may be made of a non-precious metal selected from the group of metals constituted by: steel, aluminum, titanium, copper, brass, lead, zinc, nickel, vanadium, tungsten, iron, tin, and beryllium; or it may be made of a material selected from the group of materials constituted by: ceramic materials, polymeric materials, and composite materials.

Similarly, stone 3 is a stone selected from the group of precious stones constituted by: diamonds, rubies, emeralds, ivory, coral, pearls, and amber.

Jewel 1 might also lack stone 3.

According to the disclosure, improved jewel 1 comprises at least one wireless communication device 4, accommodated within a cavity 5 formed in said main body 2 at stone 3.

Wireless communication device 4 typically comprises a microchip and an antenna (cf. also FIGS. 3 and 4 described hereinbelow), and is sometimes called just microchip 4 hereinbelow. Such a microchip may be of the programmable type and include a memory. Preferably, wireless communication device 4 is or comprises an NFC (acronym of English expression: Near-Field Communication) tag.

In the embodiment shown in FIG. 2, advantageously, cavity 5 is of the type open towards the stone 3 and comprises inside it means 6 for spacing the microchip 4 from the material of which said main body 2 is made, so as to avoid shielding effects of an electromagnetic type produced by said material to the detriment of the functionality of said microchip 4.

In the embodiment shown in FIG. 2, the spacer means 6 comprise an epoxy resin compound, for example of the UV type (namely, hardening once subject to ultraviolet rays), adapted to fill cavity 5 and to embed at least partly, if not completely, the microchip 4.

Moreover, means 7 for retaining the stone 3 are provided for, formed, in the embodiment, for example by a bezel, at the perimetric edge of cavity 5 so as to hide the microchip 4 and the spacer means 6 from the user's view. In the embodiment shown, the setting of stone 3 is of the bezel type and the retention means 7 comprise a cylindrical band 71 (or bezel) contiguous to the open cavity 5 for accommodating the wireless communication device 4 or microchip 4, cavity 5 which, as shown, is filled with the resin 6 in which microchip 4 is embedded. Retention means 7 may however also comprise a jaw setting or another type of setting.

Stone 3 may have an identification code 8 etched on an external portion thereof and associated in a one-to-one relation with microchip 4.

More in detail, identification code 8 is of a two-dimensional type, for example is of the QR Code type.

Figure 3:
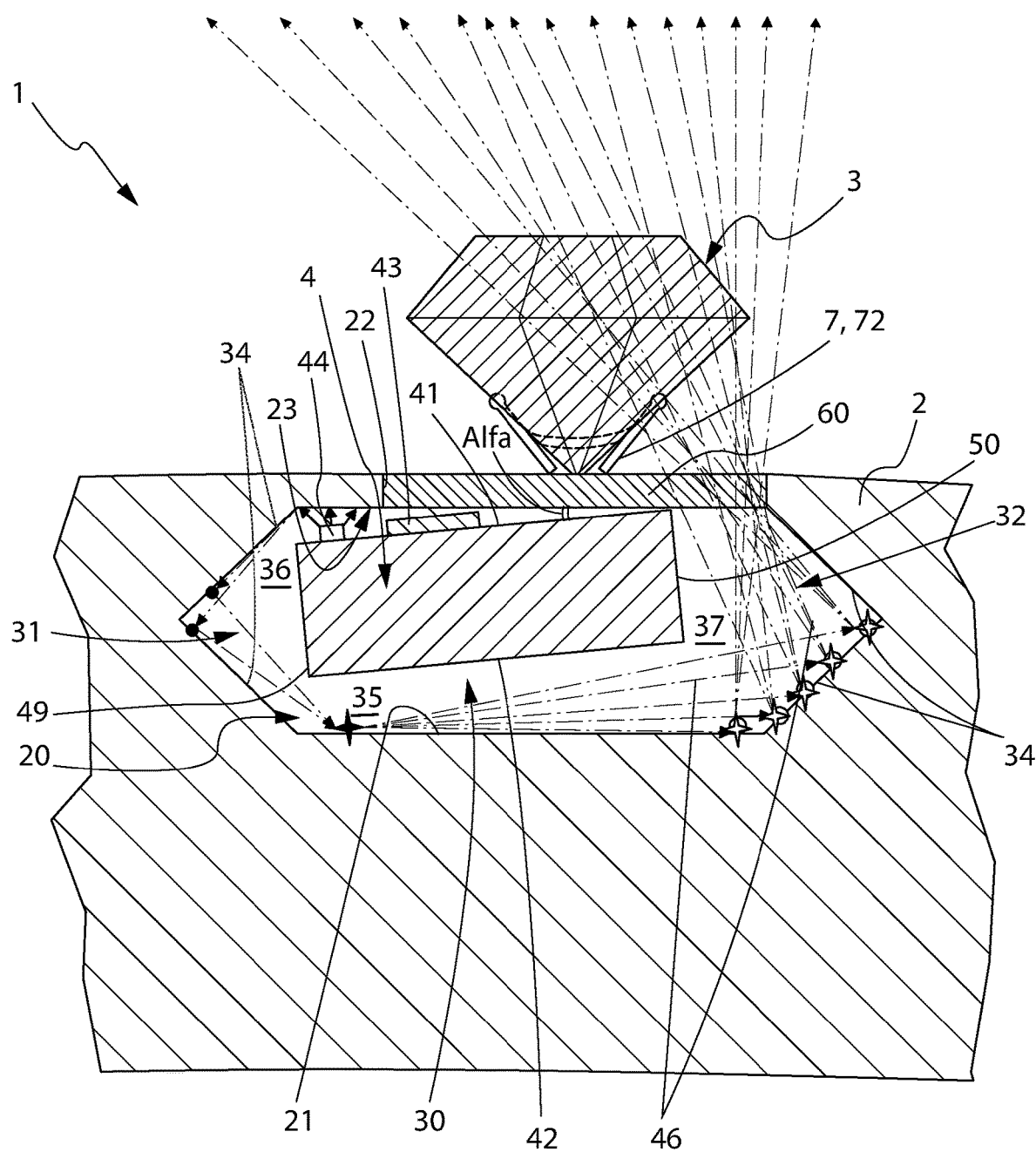
FIG. 3 is also a diagrammatical sectional view of a particular of a jewel according to another embodiment of the disclosure.
Figure 4:
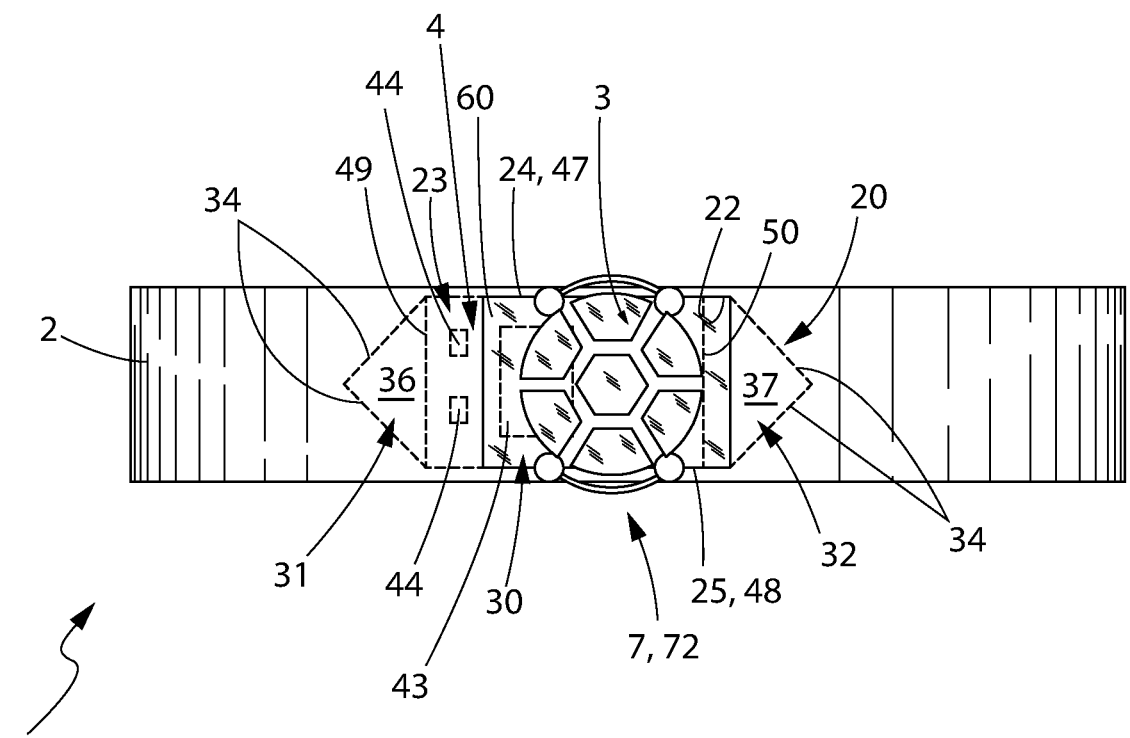
FIG. 4 is a diagrammatical top view of the particular of FIG. 3.

A particular of another embodiment is shown in FIGS. 3 and 4. Such an embodiment is only described in what it differs from the one disclosed above.

Advantageously, cavity, indicated herein with reference number 20, is again of the type open towards the stone 3. Cavity 20 is however provided with a bottom wall 21 opposite the mouth 22.

Communication device 4 is accommodated within cavity 20 spaced enough from the material of which the main body 2 is made, so as to avoid shielding effects of an electromagnetic type produced by said material to the detriment of the functionality of communication device 4.

Communication device 4 has, typically, the shape of a right parallelepiped. Communication device 4 is arranged with a first face 41 thereof facing the mouth 22 of cavity 20. A second face 42, opposite the first face 41, faces towards the bottom wall 21 of cavity 20.

On the first face 41, communication device 4 has a microchip 43 and a pair of leads 44 of an antenna (not shown).

The antenna may be of the coil type or it may be a planar disc-shaped antenna; in the second case, the antenna is preferably arranged onto the first face 41 of communication device 4.

Communication device 4 is slanting with respect to the bottom wall 21 of the cavity 20.

Communication device 4 is spaced from the walls of cavity 20 at its second face 42, and at least at another pair of opposed faces thereof, so as to allow propagation of the signal in the space between the wireless communication device 4 and the walls of cavity 20. The signal is free to propagate under and about communication device 4, in a path diagrammatically shown by arrows 46.

In particular, communication device 4 is spaced from bottom wall 21 and from walls 34 (better disclosed hereinafter) at opposed ends of cavity 20.

It is to be noted that the spacing from the bottom wall 21 is advantageously automatically obtained thanks to the above-mentioned slanting.

Preferably, communication device 4 is inserted within cavity 20 with such an orientation that the plane of its first face 41 forms an acute angle ALFA with a plane defined by the bottom wall 21 and/or with a plane defined by the mouth 22. Under the expression "defined", it is meant to indicate that the bottom 21, respectively the mouth 22, or their best two-dimensional approximation, lie within such a plane.

The acute angle is preferably comprised between 4.5° and 7°, more preferably it is 5.8°.

Preferably, cavity 20 cavity comprises an undercut region 23 and wireless communication device 4 is partly inserted in said undercut region 23. This provision advantageously allows the antenna leads 44 to be hidden from view, by arranging them facing the undercut region 23. Moreover, without wishing to be bound by any theory, the present inventor believes that the undercut region 23 might have a positive effect on the propagation of the communication signal.

Such an undercut region 23 is easily directly made during manufacture of the jewel, through a microcasting process. Such a process optionally comprises making a 3D design of the jewel, printing a wax model, wrapping the wax model with a plaster paste, casting the molten metal (or other material) of the main body 2 of jewel 1 inside the plaster paste, which melts the wax and forms the jewel with cavity 20 having the undercut region 23.

Preferably, cavity 20 is advantageously empty, apart from the communication device 4 accommodated therein. In particular, there is no member or adhesive substance for retaining the communication device 4. Communication device 4 is fixed in position within cavity 20 through interference fit. In particular, the interference fit is made between a pair of opposed faces 47, 48 of communication device 4, different from its first face 41 facing toward the mouth 22 of cavity 20 (and toward the undercut)—and thus different from its second face 42 opposite the first face 42 and facing toward the bottom 21 of cavity 20. The provision of interference fitting the communication device between two opposed lateral walls of the cavity and a pair of opposed faces thereof, different from that facing toward the mouth of cavity, represents an aspect of the subject-matter disclosed herein, independently from the fact that it is used in combination with other aspects of jewel 1 (and in particular the slanting of communication device 4) or not.

However, it is emphasized that the contact with the material of which main body 2 is made, along interference-fit surfaces that represent two opposed faces of communication device 4 different from that facing toward the mouth of cavity, does not affect the advantageous feature of avoiding shielding effects of an electromagnetic type produced by said material to the detriment of the functionality of said communication device 4. Indeed, as described above, the signal is free to propagate about the other faces of communication device 4, which are spaced from the material of which the main body 2 is made.

Preferably cavity 20 has the shape of an irregular dodecahedron, it being defined by:
  a parallelepiped chamber 30 having a first face defining the bottom wall 21 of cavity 20, a second face opposite the first one and at which the mouth 22 of cavity 20 is defined, a third and a fourth faces orthogonal to the first and the second faces, opposite to each other and defining lateral walls 24, 25 of cavity, the parallelepiped chamber 30 being open at a fifth and a sixth faces orthogonal to the first to fourth faces and opposite to each other, and two chambers 31, 32 having the shape of a right pyramid open at the respective base face, said respective base faces coinciding with said fifth and sixth faces of the parallelepiped chamber 30.

In the case shown, the distance between the third and fourth faces of the parallelepiped chamber 30, namely the distance of lateral walls 24, 25 of cavity 20, is such as to provide the interference fit with the communication device 4, thus is essentially equal to the distance between the coupling faces 47, 48 of the communication device 4—and substantially equal to one of the two sizes of the first face 41 of communication device 4.

The distance between the first and second faces of the parallelepiped chamber 30, namely the depth of cavity 20, is such as to allow accommodation of the communication device 4 with the desired slant and spaced from the bottom 21 of cavity 20.

The distance between the fifth and sixth faces of the parallelepiped chamber 30 is such as to allow accommodation of the communication device 4 with the desired slant and spaced from the triangular walls 34 of the pyramid-shaped chambers 31, 32 of cavity 20. Said distance between the fifth and sixth faces of the parallelepiped chamber 30, added to the height of the pyramids of the pyramid-shaped chambers 31, 32, defines one size of cavity 20, its length in the exemplary case shown.

In the aforementioned way, an empty space 35 under the communication device 4 and empty spaces 36, 37 at two of the faces 49, 50 of communication device 4 not held through interference, namely at opposed ends of cavity 20, are formed.

Preferably, communication device 4 is arranged within the parallelepiped chamber 30 in such a way that one edge thereof lies on the one among the fifth and the sixth faces which is at the undercut region 23 of cavity 20 (face 49 in FIGS. 3, 4).

Without wishing to be bound by any theory, the present inventor believes that the dodecahedral shape of cavity 20 has a positive effect on the propagation of the communication signal, in that the signal path is somehow deflected by the cavity wall in the undercut region 23, by the triangular walls 34 of the two pyramid-shaped chambers 31, 32, and by the bottom wall 21 of cavity 20, forming the path diagrammatically shown by arrows 46 about communication device 4. Although other polyhedral geometries are possible, experimental tests have demonstrated that the described shape allows optimal performance with very small cavity size, fully compatible with jewels of any desired shape.

In any case, cavity 20 could be of another shape, and also be simply formed by the parallelepiped chamber alone.

In the example shown, wireless communication device 4 is interference fitted between the walls of cavity 20 and its longest lateral faces 47, 48, but it could be turned by 90° and be interference fitted between the walls of cavity 20 and its shortest lateral faces 49, 50.

According to an alternative not shown, parallelepiped chamber 30 and/or cavity 20 might have everywhere greater size than communication device 4, so as to allow propagation of the signal without negative effects by the material of main body 2 all around communication device 4. In such a case, communication device 4 might be suspended 4 in cavity 20, for example through a suitable stand.

Although not necessary, as stated above, cavity 20 might be filled with a gel, a vegetable fiber, a fabric or other non-electromagnetically insulating material, including, but preferably different from, epoxy resin.

In the embodiment shown in FIGS. 3 and 4, advantageously, cavity 20 additionally includes a plate 60 covering its mouth 22, made of an essentially amagnetic, and thus "transparent" to electromagnetic field, material, preferably a hard stone. Preferred materials for plate 60 comprise Malachite, Onyx, Mother of Pearl, Lapis Lazuli, Turquoise, Coral, Opal, Garnet, Aquamarine, Actinolite, Agate, Botswana Agate, Moss Agate, Alexandrite, Stromatolytic Algae, Amazonite, Amber, Amethyst, Ammonite, Andalusite, Angelite, Antimonite, Apatite, Yellow Apatite, Apophyllite, Aragonite, Astrophyllite, Aventurine, Azurite, Barite, Yellow Beryl, Biotite, Blenda, Bornite, Bronzite, Cacoxenite, Chalcedony, Calcite, Blue Calcite, Optical Calcite, Chalcopyrite, Celestite, Cassis Madagascaristensis, Charoite, Chiastolite, Cleavelandite, Cobalt Calcite, Coral, Bamboo Coral, Carnelian, Chrysoberyl, Chrysocolla, Chrysoprase, Rock Crystal, Chromodiopside, Cypraecassis Rufa, Danburite, Diamond, Rough Diamond, Jasper, Dalmatian Jasper, Orbicular Jasper (Oceanic Jasper), Diopside, Dioptite, Dumerite, Ekanite, Heliodorus, Heliotrope, Hematite, Hemimorphite, Enstatite, Eosite Epidote, Phlogopite, Fluorite, Fuchsite, Gasparite, Nephrite Jade, Gypsum, Jade, Garnet, Herkimer, Heulandite-Hiddenite, Howlite, Iolite (Cordierite), Kunzite, Labradorite (Spectrolite), Lapis Lazuli, Larimar (Blue Pectolite), Etna Lava, Fossil Wood, Lepidocrosite, Lepidolite, Madreperla, Madrepora, Colored Magnesite, Magnetite, Malachite, Mangano Calcite, Marcasite, Martite-Meteorite, Mokaite, Moldavite, Moqui Marbles, Morganite, Muscovite, New Jade, Ox's Eye, Hawk's Eye, Iron Eye, Cat's Eye, Tiger's Eye, Shiva's Eye, Olivine, Onyx, Opal, Andean Opal, Boulder Opal, Fire Opal, Opalite, Orpiment, Orthoclase, Obsidian, Snowflake Obsidian, Noble Obsidian, Pectolite, Leopard Skin, Pearls, Pietersite, Moonstone, Sunstone, Stone of 'Gold, Paesina Stone, Pyrite, Prasiolite, Prehnite, Ametrine Quartz, Cathedral Quartz, Citrine Quartz, Nematoid Quartz, Smoky Quartz, Hyaline Quartz, Lemon Quartz-Madeira Quartz, Morion Quartz, Rose Quartz, Rutilated Quartz, Skeleton Quartz, Tourmaline Quartz, Lodolite Quartz, Root of Emerald, Native Copper, Realgar, Rhyolite, Rhodochrosite, Rhodolite, Rhodonite, Ruby, Ruby-Fuchsite, Ruby-Zoisite (Anyolite), Rock salt, Scapolite, Septaria, Selenite, Serafinite, Serpentine (Verdite), Shungite, Sillimanite, Emerald, Sodalite, Spectrolite, Spinel, Staurolite, Stilbite, Strombus Gigas, Sugilite, Tanzanite, Tectite, Titanite, Topaz, Tourmaline, Black tourmaline, Green tourmaline, Tsavorite, Turquoise, Ulexite, Unakite, Uvarovite, Vanadinite, Variscite, Zaffir, Zircon, Zoisite and Sulfur, etc.

Plate 60, that may have a thickness comprised for example between 1.5 mm and 2.00 mm, allows communication device 4 to be protected against external agents, and to hide it from view. Plate 60 might however be missing.

In the embodiment shown in FIGS. 3 and 4, means 7 for retaining stone 3 comprise a jaw setting 72, but they might comprise a bezel setting or a setting of another type.

For the rest, to that embodiment, the variants and generalizations discussed with reference to the embodiment of FIG. 2 apply.

Plate 60 might be provided for also in the embodiment above discussed with reference to FIG. 2.

In both embodiments, instead of a precious stone 3, a pearl, a cameo, a cabochon, a briolette, a chiselling or an embossing might be provided.

Figure 5:
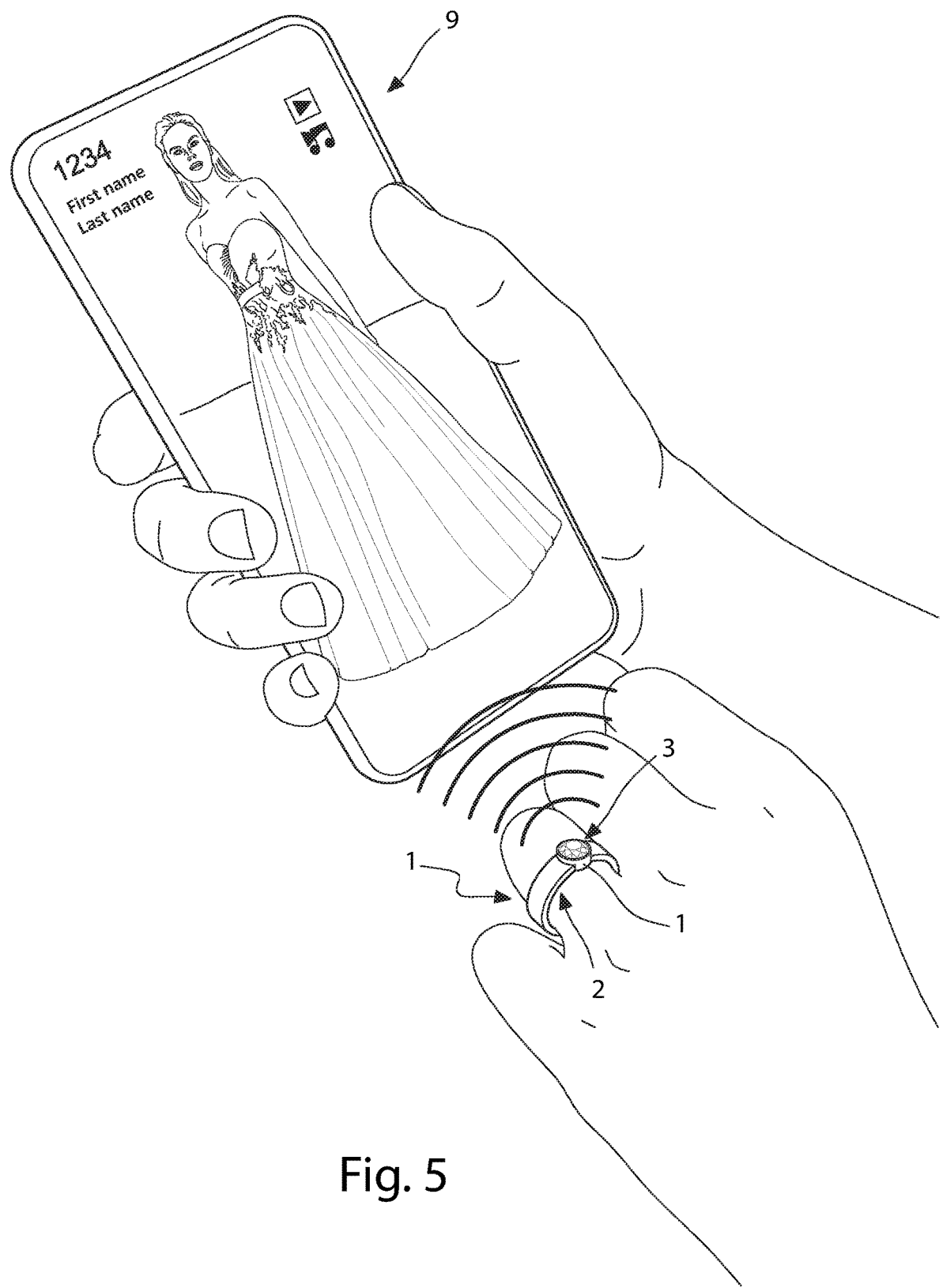
FIG. 5 is a diagrammatical perspective view during the operation of the jewel shown in FIG. 1.

The operation of the improved jewel 1 is described hereinbelow, also with reference to FIG. 5.

Thanks to the memory capacity of the microchip of communication device 4, of the order of a few hundred bytes, it is possible to store directly in the microchip, for example through a specific user interface application, information such as, still by way of an example, the ownership of the jewel and/or an internet address, namely an URL (acronym of English expression: Uniform Resource Locator).

At such an URL, which may point to a server—possibly linked to a personal account—remotely accessible through a terminal 9 adapted for data transmission for internet connections, multimedia contents may in turn be loaded, such as images, videos, audio tracks, texts with dedications and the like and, furthermore, technical information about the jewel such as the identification code of stone 3 and indications about the material of which the main body 2 is made.

In this manner, improved jewel 1 is part of a telematic system, comprising the improved jewel 1 and at least one terminal 9 comprising first communication means adapted to communicate with the communication device 4 in order to receive at least one identification code associated with improved jewel 1 (for example, an identification code of the NFC tag), and second communication means adapted to communicate via a telematic network with a server.

More in detail, the server is configured to send information associated with the identification code to terminal 9, such as for example the identification code 8 associated with precious stone 3, information about ownership of the improved jewel 1, selectable multimedia contents, which may be downloaded and pre-uploaded by a user at will.

In this manner, a one-to-one relation between the identification code of stone 3 and microchip 4 is made. Alternatively or additionally thereto, the identification code of stone 3 may also be stored directly into microchip 4 and/or the identification code of microchip 4 may also be encoded into the identification code of stone 3.

Preferably, terminal 9 comprises a smartphone or similar mobile device, that advantageously may also be provided with a specific app to manage interaction with the communication device 4 and/or with the server.

In practice it has been ascertained that the improved jewel, according to the disclosure, allows to intrinsically contain such information as to make it univocally identifiable, so as to allow it to be returned in case of loss or theft and/or to crystallize forever a moment, a memory, an emotion to be given and handed down, by easily remotely acceding a multimedia library. For example, a user, for example the artist, the jeweler or the purchaser can upload the information to the server at the time of creation of jewel 1, of sale thereof or of purchase thereof, and a second user, for example who receives the jewel as a gift or who finds it lost, may download it from the server.

An advantage of the improved jewel according to the present disclosure resides in that the communication microchip may be embedded directly in the main body of the jewel, and that the latter may be made in any material without fearing electromagnetic shielding effects of any kind against the microchip.

A further advantage of the improved jewel according to the present disclosure resides in that the microchip turns out to be totally hidden from user's view. In other words, integration of the microchip is such as not to alter the aesthetic harmony of the jewel in any way.

A further advantage of the improved jewel according to the present disclosure resides in that small size stones may be used, characterizing it with a chic and refined design.

The jewel with increased functionality thus conceived is susceptible of several changes and variants, all lying within the scope of the attached claims.

Moreover, all details may be replaced by other technically equivalent elements. In practice, the materials used, as well as size and contingent shapes, may be whatever according to the needs and the state of the art.

The above is a description of various embodiments of inventive aspects, and further changes can be made without departing from the scope of the present disclosure. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

The invention claimed is:

1. A jewel comprising: a main body and at least one wireless communication device accommodated within a cavity formed in said main body, wherein
   said at least one communication device is arranged slanting with respect to a bottom wall of said cavity, partly accommodated in an undercut region of said cavity and spaced from the bottom wall and from walls at opposed ends of said cavity, whereby propagation of the signal in the space between said at least one communication device and walls of said cavity is allowed.

2. The jewel according to claim 1, wherein said at least one communication device is held in said cavity through interference fit between a pair of its opposed faces of said at least one communication device and two opposed lateral walls of said cavity, said opposed faces being different from one first face of said at least one communication device, facing toward the undercut and the mouth of said cavity.

3. The jewel according to claim 2, wherein said at least one communication device is inserted within said cavity with an orientation such that the plane of the first face facing toward the undercut and the mouth of said cavity forms an acute angle with a plane defined by the bottom wall of said cavity or by the mouth of said cavity.

4. The jewel according to claim 3, wherein said acute angle is comprised between 4.5° and 7°.

5. The jewel according to claim 3, wherein said acute angle is 5.8°.

6. The jewel according to claim 1, wherein leads of an antenna of said at least one the communication device face the undercut region.

7. The jewel according to claim 1, comprising a plate made of an essentially amagnetic material, which closes the mouth of said cavity, hiding at least part of said at least one communication device from view.

8. The jewel according to claim 7, wherein the essentially amagnetic material is a hard stone.

9. The jewel according to claim 1, wherein said cavity has an irregular dodecahedron shape, said cavity being defined by:

a parallelepiped chamber having a first face defining the bottom wall of said cavity, a second face opposite the first one and at which the mouth of said cavity is defined, a third face and a fourth faces orthogonal to the first and the second faces, opposite to each other and defining lateral walls of said cavity-, the parallelepiped chamber being open at a fifth face and a sixth faces orthogonal to the first to fourth faces and opposite to each other, and two chambers having a right pyramid shape open at the respective base face, said respective base faces coinciding with said fifth and sixth faces of the parallelepiped chamber.

10. The jewel according to claim 9, wherein the distance between the third and fourth faces of the parallelepiped chamber is such as to provide interference fit with said at least one communication device, essentially equal to the distance between the coupling faces of said at least one communication device, the distance between the first and second faces of the parallelepiped chamber is such as to allow accommodation of said at least one communication device with the desired slant and spaced from the bottom of said cavity, and the distance between the fifth and sixth faces of the parallelepiped chamber is such as to allow accommodation of said at least one communication device with the desired slant and spaced from triangular walls of the pyramid-shaped chambers of said cavity.

11. The jewel according to claim 1, wherein said at least one communication device comprises a Near Field Communication, NFC, microchip.

12. The jewel according to claim 1, comprising at least one object selected from the group consisting of a precious stone, a pearl, a cameo, a cabochon, a briolette, a chiseling, and an embossing, associated with said main body by retention means at said cavity, said retention means being formed at a perimetral edge of said cavity so as to hide said at least one communication device from a user's view.

13. The jewel according to claim 12, wherein said at least one object has an identification code etched on an external portion of said at least one object and associated in a one-to-one relation with said at least one communication device.

14. A telematic system, comprising: a jewel (4) according to claim 1, and at least one terminal configured to communicate with said at least one communication device to receive at least one identification code associated with said jewel and to communicate via a telematic network with a server; said server being configured to send information associated with said identification code to said terminal.

* * * * *